United States Patent [19]

Hönig et al.

[11] 4,356,276

[45] Oct. 26, 1982

[54] BINDER COMBINATION FOR CATHODICALLY DEPOSITABLE PAINTS

[75] Inventors: Helmut Hönig; Wolfgang Leitner; Georg Pampouchidis, all of Graz, Austria

[73] Assignee: Vianova Kunstharz, A.G., Werndorf, Austria

[21] Appl. No.: 302,661

[22] Filed: Sep. 15, 1981

[30] Foreign Application Priority Data

Sep. 25, 1980 [AT] Austria ............................. 4768/80

[51] Int. Cl.³ .............................................. C08L 63/00
[52] U.S. Cl. ................................. 523/404; 525/454; 525/490; 525/528; 528/69
[58] Field of Search ............ 525/528, 454, 490; 528/69; 423/402

[56] References Cited

U.S. PATENT DOCUMENTS

| | | | |
|---|---|---|---|
| 3,373,221 | 5/1968 | May ........................................ | 525/922 |
| 3,478,126 | 11/1969 | Turpin .................................... | 525/528 |
| 4,035,523 | 7/1977 | Pampouchidis ....................... | 525/528 |
| 4,162,274 | 7/1979 | Rosenkranz ........................... | 528/69 |

FOREIGN PATENT DOCUMENTS

| | | | |
|---|---|---|---|
| 28401 | 5/1981 | European Pat. Off. ............ | 525/528 |
| 53-10652 | 1/1978 | Japan .................................... | 525/528 |

*Primary Examiner*—Paul Lieberman
*Attorney, Agent, or Firm*—A. W. Breiner

[57] ABSTRACT

Binder combinations for the formulation of cathodic paints comprising blends of epoxy resins as follows: (A) 40 to 80% by weight of reaction products of epoxy acrylates with basic monoisocyanates; (B) 5 to 30% by weight of reaction products of epoxy amine adducts with unsaturated monoisocyanates, and (C) an epoxy resin modified with a semi-ester of a dicarboxylic acid anhydride and an N-hydroxyalkyloxazolidin and an amine, rendered water soluble through neutralization of the basic groups. The binder combinations as defined have enhanced throwing power and improved stability of the paint tank.

10 Claims, No Drawings

BINDER COMBINATION FOR CATHODICALLY DEPOSITABLE PAINTS

The present invention is directed to binder combinations. More particularly the invention relates to a binder combination of three different resin components for use in the formulation of cathodic depositable paints.

In the paint industry it is normal in many cases to combine a variety of resin types by mixing or combining them through chemical reaction in order to obtain special properties in a binder composition. Additionally, by combination of various materials it is possible to make use of an enhanced pigment wetting capacity of one component when producing highly loaded pigment pastes and to use the second component to finish the paint. Further, in electrodeposition, in particular cases, two-component systems are desirable, one component serving as the pigment carrier and the other component serving as the binder. The two components may either be mixed in the electrodeposition tank or prior to charging.

According to the present invention there is disclosed a combination of binders based on modified epoxy resins, particularly useful for the formulation of improved cathodic paints, which are blends of (A) 40 to 80% by weight of an epoxy resin having an epoxy equivalent of from 150 to 800, the epoxy groups thereof being esterified with equimolar quantities of acrylic acid and/or methacrylic acid and/or a semi-ester of a dicarboxylic acid anhydride and a hydroxyalkyl(meth)acrylate, the hydroxy groups thereof, being free or set free, reacted totally or partially with the reaction product obtained from the reaction of equimolar quantities of toluene diisocyanate and a dialkanolamine;

(B) 5 to 30% by weight of an epoxy resin having an epoxy equivalent of from 150 to 800, the epoxy groups thereof being reacted with equimolar quantities of a dialkylamine and/or a dialkanolamine and optionally a portion of monocarboxylic acids, preferably oil fatty acids, the hydroxy groups thereof, being free or set free, reacted totally or partially with a reaction product of equimolecular amounts of toluene diisocyanate and a hydroxyalkyl(meth)acrylate, and (C) 10 to 40% by weight of an epoxy resin with an epoxy equivalent of between 150 and 800,
30 to 60 mole % of the epoxy groups thereof being reacted with a semi-ester of a dicarboxylic acid anhydride and an N-2-hydroxyalkyloxazolidin, and
10 to 50 mole % of the epoxy groups thereof being reacted with a primary and/or secondary amine,
the balance being reacted with a saturated and/or unsaturated monocarboxylic acid.

The aforesaid blends can contain water-tolerant solvents and/or organic and/or inorganic acids and optionally water.

The binders formulated from the aforesaid combination or blend show a substantially enhanced throwing power (i.e., deposition on shielded surfaces) as compared to the performance of any of the individual component or to a combination of any two components. Furthermore, by utilizing component (C) with components (A) and (B), the degree of neutralization required for the stability of the paint tank can be reduced. Accordingly, the electrochemical deposition equivalent is increased.

When using component (C) for the formation of the pigment paste, further applicational advantages can be achieved. The pigment paste thus produced can be easily worked into diluted solutions of component (A) or blends of components (A) and (B). This provides a simple way of obtaining a two-component system for filling and replenishing electrodeposition tanks. This method, in many cases, permits considerable ease in handling in cases where there are no, or only unsatisfactory premix installations available. On the other hand, the pigment binder ratio of the tank material can be adjusted much faster during operation. Another advantage of the highly pigmented pastes is a reduced pigment sedimentation.

It is surprising that with the use of components with basically different cross-linking mechanism the resistance characteristics of the films were not influenced. While components (A) and (B) substantially crosslink through thermal polymerization of the chain-end double bonds, component (C) forms a film substantially through re-esterification or etherification of hydroxy and/or N-methylol groups.

Products suitable as component (A) include those described in AT-PS Nos. 342 169, 346 989 or 353 369. Component (A) is a cationic modified epoxy resin ester which cures through thermic polymerization. The epoxy groups of the epoxy resins having an epoxy equivalent of from 150 to 800 are esterified in equimolar proportion with $\alpha,\beta$-unsaturated monocarboxylic acids such as acrylic or methacrylic acid, or with semiesters of dicarboxylic acid anhydrides and hydroxyalkyl(meth)acrylates, and the free hydroxy groups, or the hydroxy groups set free, are reacted totally or partially with a reaction product of equimolar quantities of toluene diisocyanate and a dialkanol amine. The preferred epoxy resins are based on Bisphenol-A or on phenol novolaks. The preparation of such products is amply discussed in the aforementioned patents.

Products suitable as components (B) are modified epoxy resins and include those described in AT-PS Nos. 342 168, 346,989 and 353 369. In the combinations of the present invention those types are preferred which contain basic and polymerizable groups and which per se are practically insoluble in water when having 50% neutralization of the basic groups. Such products, as disclosed in AT-PS No. 353 369, are known as suitable components for cationic resin systems. The resins used as component (B) according to the present invention are reaction products of epoxy resins of the Bisphenol-A type and phenol novolak type, having an epoxy equivalent of from 150 to 800, and dialkyl- or dialkanol amines, and optionally monocarboxylic acids, and isocyanate intermediates obtained from equimolar quantities of toluene diisocyanates and hydroxyalkyl(meth)acrylates. Methods for the preparation of component (B) are disclosed in the above-described patent specifications.

Products suitable as component (C) are described in U.S. application Ser. No. 201,968, filed Oct. 29, 1980. The products are water-dilutable epoxy resin esters carrying oxazolidine groups. Part of the epoxy groups are reacted with primary and/or secondary amines. The products may, in addition, optionally contain radicals of monocarboxylic acids (oil fatty acids, (meth)acrylic acids, semi-esters of dicarboxylic acid anhydrides and hydroxy compounds like alcohols or hydroxyalkyl(meth)acrylates). The epoxy resins used in the preparation of component (C) include those also used in the preparation of components (A) and (B). The oxazolidine semi-esters are obtained through esterification of an N-2-hydroxyalkyloxazolidin with a dicarboxylic acid anhydride, preferably phthalic anhydride or a hydration or substitution product of such a compound. The amines used in addition preferably are dialkylaminoalkylamines, optionally in conjunction with dialkylamines. Component (C) is particularly suited as a mill base resin for the pigments and extenders. Due to the absence of an isocyanate component there are many more choices in the selection of the solvents. This, in turn, further enhances the excellent pigment wetting characteristics.

The components of the binder system are blended at a maximum temperature of 80° C., either as solutions in organic solvents and/or in water, upon neutralization with acids, with variations according to the needs of the special electrodeposition process. The preferred method is to have a supply of a blend of components (A) and (B), and component (C) is used in the let-down process for milling the pigments and extenders and can be supplied to the ultimate consumer, either alone or in mixture with components (A) and (B). The weight ratios of the components in an electrodeposition binder system can vary within the following ranges, calculated on resin solids:

40-80% by weight of component (A);
5-30% by weight of component (B), and
10-40% by weight of component (C).

The solvents employed are water tolerant such as low molecular weight alcohols, glycol ethers, and glycol etheracetates. The acids used for neutralization are known to those skilled in the art. The preferred acids are formic acid or acetic acid in aqueous dilution or in concentrated form.

Electrodeposition methods and parameters are those known to one skilled in the art. The following examples illustrate the invention without limiting its scope. Parts or percentages are by weight, unless otherwise stated.

Key to the abbreviations used in the examples:
EPH I: Epoxy resin based on Bisphenol-A (epoxy equivalent 180-190)
EPH II: Epoxy resin based on Bisphenol-A (epoxy equivalent 480-510)
EPH III: Epoxy resin based on a novolak resin (epoxy equivalent 170-180)
S 1: methacrylic acid
S 2: acrylic acid
S 3: semi-ester of THPA and HEMA
S 4: semi-ester of THPA and HEA
S 5: semi-ester of PA and HEMA
S 6: tall oil fatty acid
S 7: semi-ester of THPA and EHA
PA: phthalic anhydride
THPA: tetrahydrophthalic acid anhydride
RFS: dehydrated castor oil fatty acid
HEA: hydroxyethylacrylate
HEMA: hydroxyethylmethacrylate
TDI: toluenediisocyanate
DEA: diethylamine
DMEA: dimethylethanolamine
DEEA: diethylethanolamine
DIPA: diisopropanolamine
DEAPA: diethylaminopropylamine
EHA: 2-ethyl-hexanol
EGLAC: monoethylene glycolmonoethyletheracetate
HIPOX: N-2-hydroxypropyl-5-methyl-oxazolidin
HETOX: N-2-hydroxyethyloxazolidin
MIBK: methylisobutylketone
DAEA: diethanolamine
AS: formic acid
ES: acetic acid
VP 1: basic intermediate of 1 mole of TDI and 1 mole of DMEA (80% in EGLAC)
VP 2: basic intermediate of 1 mole of TDI and 1 mole of DEEA (80% in EGLAC)
VP 3: polymerizable intermediate of 1 mole of TDI and 1 mole of HEA (100%)
VP 4: polymerizable intermediate of 1 mole of TDI and 1 mole of HEMA (100%)
H 1: semi-ester of THPA and HIPOX, 70% in MIBK
H 2: semi-ester of THPA and HETOX, 80% in EGLAC
EGL: ethyleneglycolmonoethylether Composition of the components (A), (B), (C) as used in the examples, calculated as resin solids, are as follows:

Component (A)

A1 = 380 EPH I + 144 S 2 (2 moles) + 329 VP 1 (1.25 moles)
A2 = 380 EPH I + 564 S 3 (2 moles) + 364 VP 2 (1.25 moles)
A3 = 1000 EPH II + 172 S 1 (2 moles) + 737 VP 1 (2.8 moles)
A4 = 650 EPH III + 1015 S 3 (3.6 moles) + 660 VP 2 (2.3 moles)

EPH is dissolved in EGLAC at 60°-70° C. and the component of group S is added. The blend is reacted at from 100° to 110° C. until the acid value is reduced to substantially 0. As the next step, at 60°-70° C., the intermediates (VP-compound) are reacted to give an NCO-value of 0. The obtained product has 80% concentration in EGLAC and is diluted down to 70% with EGL.

Component (B)

B 1 = 380 EPH I + 210 DAEA + 380 VP 4 (1.25 moles)
B 2 = 1000 EPH II + 266 DIPA + 580 VP 3 (2.0 moles)
B 3 = 650 EPH III + 260 DAEA + 280 RFS + 304 VP 4 (1.4 moles) + 580 VP 3 (2.0 moles)

The EPH is dissolved in EGLAC and, at 90°-120° C., the amine is slowly added. Then the batch is reacted at 150° C. for another hour. Optionally the monocarboxylic acid is added at this temperature and reacted completely. At 60° to 70° C. the intermediates (VP-compounds) are added and reacted to an NCO-value of 0. The products have a concentration of 70% in EGLAC.

Component (C)

|  | EPH | OXAZOLIDIN SEMI-ESTER | AMINE | MONO-CARBOXYLIC ACID |
| --- | --- | --- | --- | --- |
| C 1 | 250 II | 742 H 1 | 80 DEAPA | 667 S 5 |
|  | 1300 III |  | 73 DEA | 168 S 6 |
| C 2 | 1000 II | 594 H 1 | 93 DEAPA | 282 S 7 |
|  | 650 III |  | 88 DEA |  |
| C 3 | 1000 II | 807 H 2 | 66 DEAPA | 451 S 3 |
|  | 650 III |  |  |  |

The components listed in this table are diluted down to 65% with EGL and heated to 75°-80° C., until the acid value has fallen to below 5 mg KOH/g. Where hydroxyalkylacrylates are used, the reaction steps are chosen in order that the formation of Michael-addition products is avoided.

EXAMPLES 1-12

In the evaluated paints the components are combined in the ratios listed in the following table (resin solids). "N" denotes the quantity of neutralizing agent, millimole acid per 100 g of resin solids.

Pigments, extenders, and water are milled with the neutralized component (C) with a pearl mill or a three-roll mill to a grain size of below 15 μm. The pigment and extender quantity are chosen in order that a pigment/binder ratio of 0.5 to 1 results. The following paint compositions were evaluated:

| Resin solids (total) | 100 |
|---|---|
| aluminium silicate pigment | 23 |
| titanium dioxide | 24 |
| water | 10 |
| lead silicate pigment | 2 |
| carbon black | 1 |
| acid | 30 milli moles |

The paint material for the tank may be prepared according to two methods (a) and (b), both leading to the same results, as follows:

(a) The concentrated resin solutions of components (A) and (B) are mixed. The necessary quantity of acid of neutralization is added. Deionized water is added for dilution in order that upon addition of component (C) a resin solids content of 12% results in the paint tank. The pigment paste made with component (C) is then stirred into the clear paint of the combination of components (A) and (B).

(b) The components (A) and (B) are neutralized with the necessary quantity of the acid and are admixed with the concentrated pigment paste made with component (C). The batch is then diluted with deionized water to a solids content of 12% by weight.

In the following table, column "V" designates deposition voltage; "U" designates throwing power in cm according to the Ford Method (4 mm-Box). In the salt spray test according to ASTM B 117-64, on zinc-phosphated steel, after stoving for 30 minutes at a temperature of 180° C., rusting of 0.5-1 mm is observed after an evaluation time of 500 hours.

| | Component | | | | | |
|---|---|---|---|---|---|---|
| | A | B | C | N (mM) | V (Volt) | U (cm) |
| 1 | 50 A1 | 20 B1 | 30 C1 | 45 ES | 220 | 22.5 |
| 2 | 60 A1 | 15 B2 | 25 C1 | 50 ES | 240 | 22.0 |
| 3 | 60 A1 | 10 B3 | 30 C1 | 50 AS | 240 | 23.0 |
| 4 | 55 A2 | 15 B2 | 30 C1 | 45 ES | 240 | 21.8 |
| 5 | 60 A1 | 20 B1 | 20 C2 | 50 ES | 240 | 21.5 |
| 6 | 60 A4 | 15 B1 | 15 C2 | 55 ES | 240 | 17.8 |
| 7 | 60 A3 | 20 B3 | 20 C3 | 45 ES | 240 | 19.4 |
| 8 | 60 A4 | 15 B2 | 15 C3 | 50 AS | 240 | 18.5 |
| 9 | 70 A1 | 15 B1 | 15 C1 | 50 ES | 240 | 18.3 |
| 10 | 65 A3 | 15 B3 | 20 C2 | 50 AS | 240 | 18.8 |
| 11 | 65 A4 | 10 B1 | 25 C3 | 40 ES | 240 | 22.5 |
| 12 | 40 A4 | 30 B1 | 30 C2 | 40 AS | 250 | 23.0 |

In the aforesaid illustrative examples various modifications can be made and still fall within the scope of the present invention. For example, the epoxy resins utilized in the examples are the commercially available resins based on Bisphenol-A or phenol novolak-type resins. Other epoxy resins commercially used in the protective coating industry can be utilized herein with substantially similar results. Additionally, the ratios of the various components can vary within the critical limitations set forth hereinbefore. These modifications being known to one skilled in the art fall within the scope of the present invention and the appended claims.

It is claimed:

1. A binder combination for cationically dispositable paints based on modified epoxy resins comprising
   (A) 40 to 80% by weight of an epoxy resin having an epoxy equivalent of from 150 to 800, the epoxy groups of which are esterified with equimolar quantities of a member of the group consisting of acrylic acid; methacrylic acid; a semi-ester of a dicarboxylic acid anhydride and mixtures thereof, and a hydroxyalkyl(meth)acrylate, the free hydroxy groups thereof being reacted totally or partially with a reaction product obtained from equimolar quantities of toluene diisocyanate and a dialkanolamine;
   (B) 5 to 30% by weight of an epoxy resin having an expoxy equivalent of from 150 to 800, the epoxy groups of which are reacted with equimolar quantities of a member of the group consisting of a dialkylamine, a dialkanolamine and mixtures thereof, the free hydroxy groups thereof being reacted totally or partially with a reaction product of equimolecular amounts of toluene diisocyanate and hydroxyalkyl(meth)acrylate, and
   (C) 10 to 40% by weight of an epoxy resin having an epoxy equivalent of between 150 and 800,
      30 to 60 mole % of the epoxy groups thereof being reacted with a semi-ester of a dicarboxylic acid anhydride and an N-2-hydroxyalkyloxazolidin, and
      10 to 50 mole % of the epoxy groups thereof being reacted with a primary and/or secondary amine, the unconsumed rest being reacted with a saturated and/or unsaturated monocarboxylic acid.

2. The binder combination of claim 1 wherein the epoxy groups of the epoxy resin of component (B) are also reacted with a monocarboxylic acid.

3. The binder combination of claim 2 wherein the said monocarboxylic acid of component (B) is a fatty acid.

4. The binder combination of claim 1 further including water-tolerant solvents.

5. The binder combination of claim 4 further including an inorganic or organic acid.

6. The binder combination of claim 5 further including water.

7. The binder combination of claim 1 wherein the epoxy resin of components (A), (B), and (C) is a Bisphenol-A based epoxy resin.

8. The binder combination of claim 1 wherein at least one of said epoxy resins of components (A), (B), and (C) is a Bisphenol-A based epoxy resin.

9. The binder combination of claim 1 wherein at least one of the epoxy resins of components (A), (B), and (C) is a phenol-novolak based epoxy resin.

10. The binder combination of claim 8 wherein at least one of said epoxy resins of components (A), (B), and (C) is a phenol-novolak based epoxy resin.

* * * * *